(12) United States Patent
Sangl et al.

(10) Patent No.: US 8,544,417 B2
(45) Date of Patent: Oct. 1, 2013

(54) PET CRATE

(75) Inventors: Douglas L Sangl, Sioux Falls, SD (US); Lyle J Van Kalsbeek, Sioux Falls, SD (US)

(73) Assignee: Roto Mold L.L.C., Sioux Falls, SD (US)

( * ) Notice: Subject to any disclaimer, the term of this patent is extended or adjusted under 35 U.S.C. 154(b) by 241 days.

(21) Appl. No.: 12/723,289

(22) Filed: Mar. 12, 2010

(65) Prior Publication Data

US 2011/0220033 A1 Sep. 15, 2011

(51) Int. Cl.
*A01K 1/03* (2006.01)

(52) U.S. Cl.
USPC .......................................... 119/455; 119/482

(58) Field of Classification Search
USPC ................ 119/452, 453, 455, 459, 463, 487, 119/496, 165, 482
IPC ........................................................ A01K 1/03
See application file for complete search history.

(56) References Cited

U.S. PATENT DOCUMENTS

| | | | | |
|---|---|---|---|---|
| 1,106,267 A * | 8/1914 | Wilson | | 119/455 |
| 2,121,658 A * | 6/1938 | Gehret | | 119/474 |
| 2,546,790 A | 3/1951 | Shook | | |
| 4,181,095 A * | 1/1980 | Sylogye | | 119/165 |
| 4,546,728 A | 10/1985 | May | | |
| 4,943,105 A | 7/1990 | Kacar et al. | | |
| 4,976,219 A * | 12/1990 | Goguen et al. | | 119/496 |
| 5,044,321 A | 9/1991 | Selph | | |
| 5,154,137 A * | 10/1992 | Stanaland | | 119/496 |
| 5,253,612 A * | 10/1993 | Goetz | | 119/496 |
| 5,289,933 A * | 3/1994 | Streich et al. | | 220/1.5 |
| 5,452,681 A * | 9/1995 | Ho | | 119/498 |
| 5,551,373 A | 9/1996 | O'Donnell | | |
| 5,785,003 A | 7/1998 | Jacobson et al. | | |
| 5,810,227 A | 9/1998 | Jorgensen | | |
| 5,893,338 A * | 4/1999 | Campbell et al. | | 119/475 |
| 5,913,285 A | 6/1999 | Pritchard | | |
| 5,941,195 A | 8/1999 | Martz | | |
| 6,223,691 B1 | 5/2001 | Beattie | | |
| 6,298,808 B1 * | 10/2001 | Crafton et al. | | 119/165 |
| 6,386,388 B1 * | 5/2002 | Overholt | | 220/608 |
| 6,408,797 B2 * | 6/2002 | Pivonka et al. | | 119/498 |
| 6,409,037 B1 * | 6/2002 | Lin et al. | | 220/4.34 |
| 6,647,925 B1 | 11/2003 | Waiters | | |
| 6,722,515 B2 * | 4/2004 | Rumpel | | 220/6 |
| 6,811,048 B2 * | 11/2004 | Lau | | 220/1.5 |
| 6,832,580 B2 * | 12/2004 | Marchioro | | 119/452 |
| D520,190 S | 5/2006 | Joyner | | |
| 7,036,458 B1 * | 5/2006 | Stornant | | 119/496 |
| 7,059,274 B2 * | 6/2006 | Cheng | | 119/455 |
| 7,191,734 B2 * | 3/2007 | Strzempko et al. | | 119/496 |
| 7,487,744 B1 * | 2/2009 | Goldberg et al. | | 119/453 |

(Continued)

FOREIGN PATENT DOCUMENTS

JP 2001261083 A * 9/2001
JP 2007075025 A * 3/2007

*Primary Examiner* — Son T Nguyen
*Assistant Examiner* — Shadi Baniani
(74) *Attorney, Agent, or Firm* — Hovey Williams LLP (57) ABSTRACT

A pet crate broadly includes a crate housing. The crate housing includes first and second connector sections and a support wall extending between and interconnecting the sections. The connector sections and wall extend between opposite housing ends of the crate housing to cooperatively present an enclosed pet space. The crate housing presents a crate opening at a corresponding housing end. The crate opening permits pet ingress and egress relative to the enclosed pet space.

11 Claims, 7 Drawing Sheets

(56) References Cited

U.S. PATENT DOCUMENTS

| | | | |
|---|---|---|---|
| 7,726,496 B2* | 6/2010 | Heinrichs et al. | 211/191 |
| 8,083,448 B2* | 12/2011 | Heinrichs et al. | 410/32 |
| 8,132,537 B2* | 3/2012 | Trunnell et al. | 119/496 |
| 2001/0054394 A1* | 12/2001 | Marchioro | 119/452 |
| 2005/0028751 A1* | 2/2005 | Strzempko et al. | 119/496 |
| 2006/0225663 A1* | 10/2006 | Chiang | 119/452 |
| 2007/0051323 A1* | 3/2007 | Guard | 119/482 |
| 2011/0023790 A1* | 2/2011 | Ver Hage et al. | 119/500 |

* cited by examiner

PET CRATE

BACKGROUND

1. Field

The present invention relates generally to a pet crate. More specifically, embodiments of the present invention concern a pet crate with a unitary housing and a pair of doors for pet ingress and egress. Furthermore, embodiments of the present invention concern a pet crate system that permits adjustable stacking of crates in both side-by-side and vertical arrangements.

2. Discussion of Prior Art

Kennels are conventional and have been used to transport and house various types of animals. Cage-type constructions have been used to provide multiple compartments for animals. It is also known in the art to have a mobile kennel that can be used to safely transport one or more animals.

Prior art kennels are problematic and suffer from various limitations. For instance, prior art kennels are unable to provide a reconfigurable array of compartments that house multiple animals.

SUMMARY

The following brief summary is provided to indicate the nature of the subject matter disclosed herein. While certain aspects of the present invention are described below, the summary is not intended to limit the scope of the present invention.

Embodiments of the present invention provide a pet crate that does not suffer from the problems and limitations of the prior art kennels and cages set forth above.

A first aspect of the present invention concerns stackable pet crates operable to be interconnected with each other to form a bank of crates arrayed in a lateral and/or vertical configuration. Each of the stackable pet crates broadly includes a crate housing. The crate housing includes first and second connector sections and a support wall extending between and interconnecting the sections, with the sections and wall extending between opposite housing ends of the crate housing to cooperatively present an enclosed pet space. The crate housing presents a crate opening at a corresponding housing end. The crate opening permits pet ingress and egress relative to the enclosed pet space. The corresponding housing end is spaced from other of the interconnected crates when the pet crates are interconnected so that the crate opening is exposed to permit pet ingress and egress. The first connector section includes a connector wall and a fastener component fixed to the connector wall. The fastener component of a first one of the pet crates is removably attached relative to the first connector section of a second one of the pet crates when the pet crates are interconnected in one of the configurations. The fastener component of the first crate is removably attached relative to the second connector section of the second crate when the pet crates are interconnected in the other configuration.

A second aspect of the present invention concerns a pet crate for connection with other similarly constructed pet crates. The pet crate broadly includes a unitary molded crate housing. The unitary molded crate housing includes vertically arranged top and bottom connector sections and a support wall extending continuously in an upright direction between and interconnecting the sections, with the sections and wall extending between opposite housing ends of the crate housing to cooperatively present an enclosed pet space. The crate housing presents a crate opening adjacent to a corresponding housing end. The crate opening permits pet ingress and egress relative to the enclosed pet space. At least one of the connector sections includes a connector wall and a fastener insert integrally molded in place within the connector wall, with the fastener insert operable to interconnect the pet crate with one or more of the other pet crates.

A third aspect of the present invention concerns a mobile pet crate configured for use in a vehicle and operable to provide crate access from locations spaced fore and aft of the pet crate when the pet crate is stored in the vehicle. The mobile pet crate broadly includes a crate housing and at least two doors. The crate housing includes vertically arranged top and bottom sections and a support wall extending between and interconnecting the sections, with the sections and wall extending between opposite housing ends of the crate housing to cooperatively present an enclosed pet space. The crate housing presents fore and aft crate openings located at corresponding housing ends. The fore crate opening permits pet ingress and egress between the enclosed pet space and the fore location. The aft crate opening permits pet ingress and egress between the enclosed pet space and the aft location. The at least two doors are swingably mounted relative to the support wall. Each of the doors is pivotally mounted relative to a corresponding crate opening, with each door operable to swing into and out of a closed position in which the door spans the corresponding crate opening and thereby restrict pet ingress and egress through the corresponding crate opening.

Other aspects and advantages of the present invention will be apparent from the following detailed description of the preferred embodiments and the accompanying drawing figures.

BRIEF DESCRIPTION OF THE DRAWING FIGURES

Preferred embodiments of the invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the preferred embodiment.

DETAILED DESCRIPTION OF THE PREFERRED EMBODIMENTS

Figure 1:
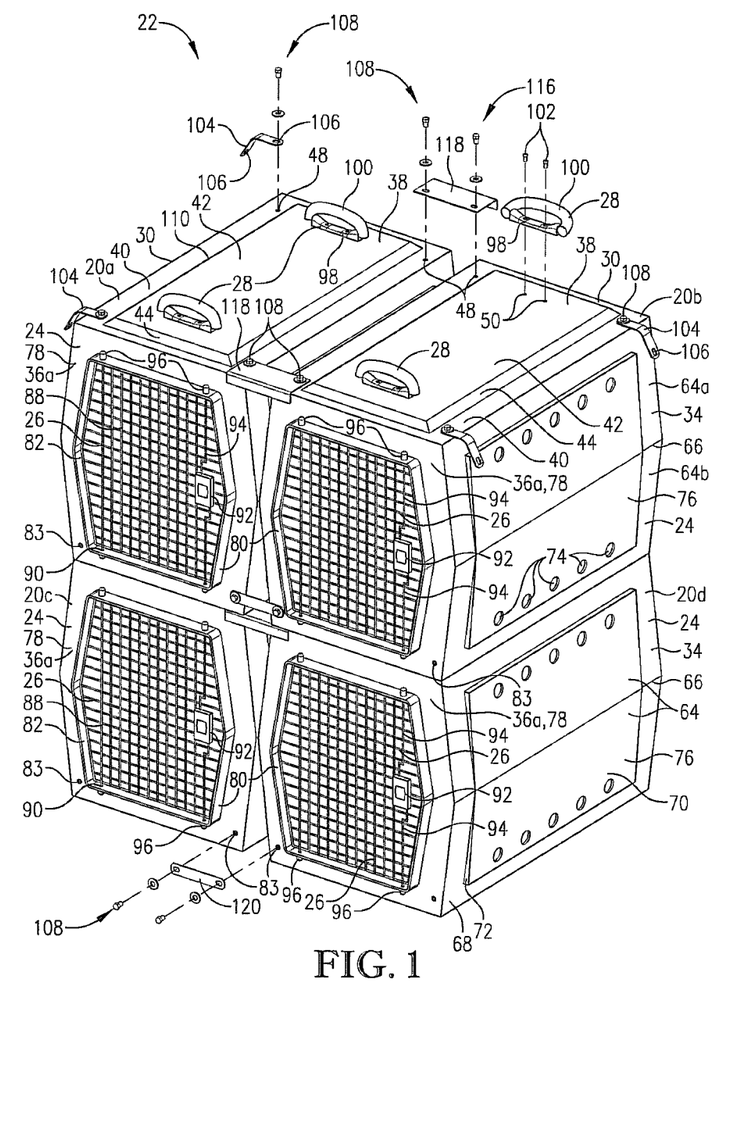
FIG. 1 is a front perspective of a bank of pet crates constructed in accordance with a first embodiment of the present invention, showing a pet crate housing that includes a top section, sidewall, and fore end wall, and showing the pet crates including pivotally mounted front doors and multiple handles, with two lateral pairs of pet crates being stacked and interconnected in a side-by-side lateral stacking configuration, and with the lateral pairs of pet crates also being stacked on top of one another and interconnected in a vertical stacking configuration.
Figure 2:
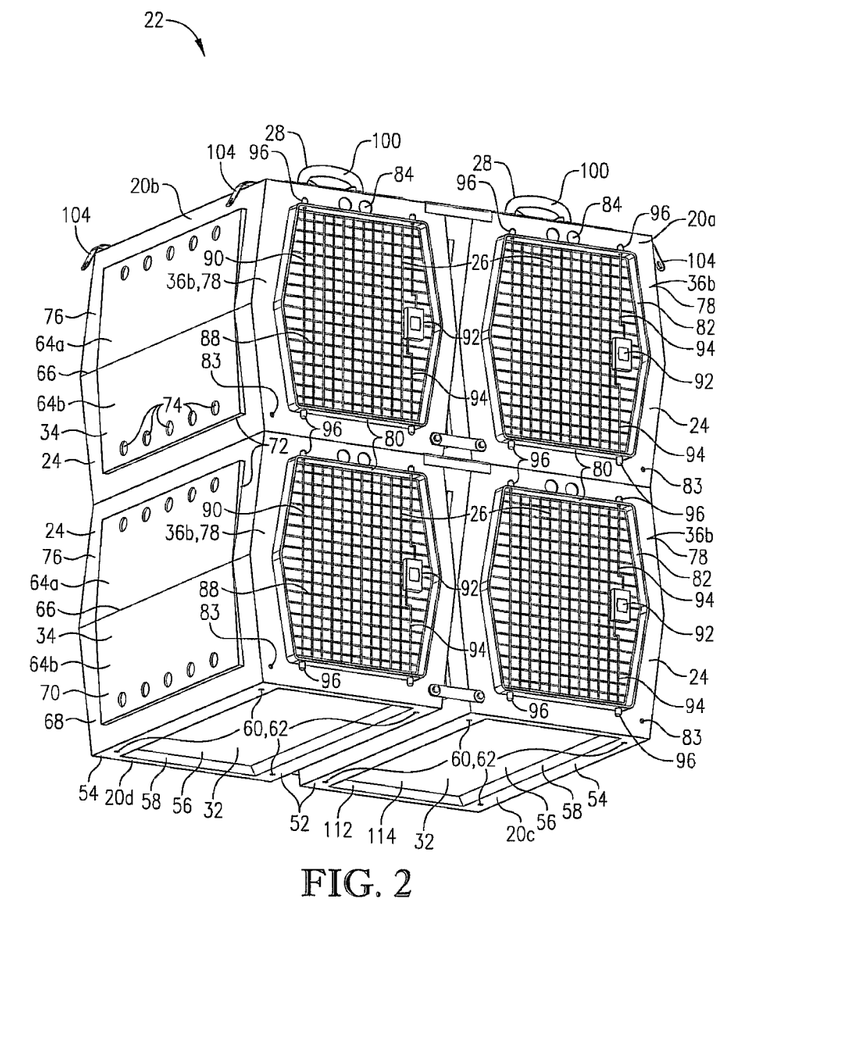
FIG. 2 is a rear perspective of the bank of pet crates shown in FIG. 1, showing a bottom section, sidewall, and aft end wall of the pet crate housing, and further showing rear doors of the pet crates.

Turning initially to FIGS. 1 and 2, pet crates 20 are each configured to serve as a kennel. In the illustrated embodiment, the pet crates 20 are adjustably configured into an array kennels that form a kennel bank 22. As will be discussed further and shown in a subsequent embodiment, the bank 22 comprises a modular system such that the pet crates 20 can be interconnected with one another in various stacked arrangements. While the illustrated pet crates 20 can be used as part of the kennel bank 22, it is also within the scope of the present invention where one of the pet crates 20 is used separate from other crates. The pet crate 20 broadly includes, among other things, a housing 24, doors 26, and handles 28.

Turning to FIGS. 1-5, the housing 24 preferably has a substantially rigid construction and includes top and bottom sections 30,32, sidewalls 34, and fore and aft end walls 36 integrally formed with one another. The top section 30 extends longitudinally between ends thereof and preferably presents a generally rectangular shape having a length and width. The top section 30 includes a top wall 38 with outer, central, and transition portions 40,42,44. The outer portion 40 is flat and provides an outer margin of the top wall 38. The central portion 42 is rectangular and is surrounded by the outer portion 40.

Furthermore, the central portion 42 is preferably spaced above the outer portion 40 so that the top section 30 includes a projection, as will be discussed. However, it is also within the scope of the present invention where the central portion 42 is alternatively positioned, e.g., where the central portion 42 is spaced below outer portion 40. The transition portion 44 interconnects the outer and central portions 40,42. As will be discussed, the portions 40,42,44 are preferably molded from a synthetic resin material.

Figure 5:
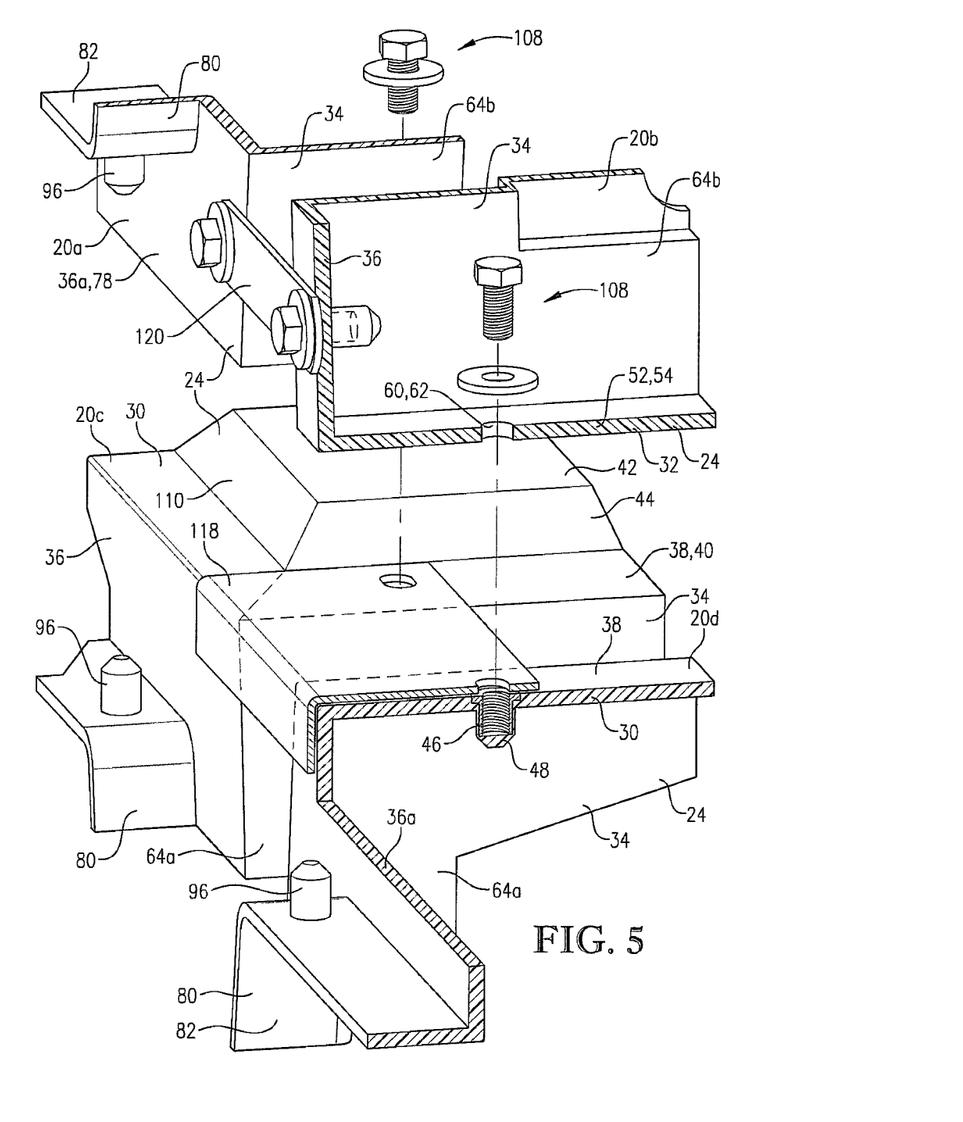
FIG. 5 is an enlarged fragmentary perspective of the bank of pet crates shown in FIGS. 1-4, showing the lateral pairs of pet crates exploded from one another, with the pet crates including lateral coupler assemblies having upper and lower couplers that interconnect upper and lower ends of side-byside pet crates to one another, and further showing a threaded nut of the pet crate molded into the top section of the corresponding pet crate.

The top section 30 further includes a plurality of internally-threaded nuts 46 (see FIG. 5). Preferably, four of the nuts 46 are secured to the outer portion 40 at corresponding coupler locations 48 that are spaced along the outer margin of the top section 30. Another four of the nuts 46 are preferably secured to the central portion 42 at corresponding handle locations 50. The nuts 46 are preferably inserts that are integrally molded in place within portions 40,42, with an encapsulating element of the wall that partly covers and encloses the nut 46. However, for some aspects of the invention, the nuts 46 could be inserted and thereby fixed onto corresponding portions by another mechanism.

As will be discussed, the top and bottom sections 30,32 are configured so that multiple pet crates 20 can be nestably stacked and secured to one another. While the top section 30 preferably includes threaded nuts, it is also within the ambit of the present invention where top section 30 includes another type of fastener insert integrally molded in place within the section wall, e.g., a threaded stud or a non-threaded fastener, for securing pet crates 20 to one another. Furthermore, for some aspects of the present invention, the top section 30 could be devoid of fasteners, e.g., where bottom section 32 includes nuts 46 and top section 30 includes holes that receive a complemental fastener to nuts 46. Yet further, for some aspects of the present invention, the pet crate 20 could be configured where sidewall 34 or end wall 36 includes nuts 46, e.g., as an alternative arrangement for interconnecting multiple pet crates 20.

The bottom section 32 extends longitudinally between ends thereof and preferably presents a generally rectangular shape having a length and width. The bottom section 32 includes a bottom wall 52 with outer, central, and transition portions 54,56,58. The outer portion 54 is flat and provides an outer margin of the bottom wall 52. The central portion 56 is rectangular and surrounded by the outer portion 54.

Furthermore, the central portion 56 is preferably spaced above the outer portion 54 so that the bottom section 32 provides a pocket, as will be discussed. However, it is also within the scope of the present invention where the central portion 56 is alternatively positioned, e.g., where the central portion 56 is spaced below outer portion 54. The transition portion 58 interconnects the outer and central portions 54,56. As will be discussed, the portions 54,56,58 are preferably molded from a synthetic resin material.

Preferably, the walls 38,52 of each section 30,32 have substantially the same shape and can be arranged in substantial registry with one another. In this manner, the sections 30,32 are preferably configured so that multiple pet crates 20 can be nestably stacked on top of one another, as will be discussed in greater detail. However, it is within the ambit of the present invention where the walls 38,52 have an alternative shape. For instance, for some aspects of the present invention, the walls 38,52 could be substantially flat so that stacked pet crates 20 do not have portions that nest with one another.

The bottom section 32 further presents a plurality of holes 60. Preferably, four holes 60 are located along the outer portion 54 at corresponding locations 62 located along an outer margin of the bottom section 32 (see FIG. 2). The locations 62 of holes 60 preferably correspond to the locations 48 of nuts 46 so that vertically stacked pet crates 20 can be nestably stacked and secured to one another when corresponding sections 30,32 of the pet crates are in substantial registration with one another.

Pet crates 20 are preferably secured in a nested condition by inserting removable fasteners through holes 60 and securing the fasteners to corresponding nuts 46 to secure adjacent top and bottom sections 30,32 to one another. While the illustrated bottom section 32 preferably includes holes 60 at locations 62 to permit removable attachment of fasteners to bottom section 32, it is also within the scope of the present invention where the bottom section 32 includes fasteners fixed at locations 62 to permit securement of stacked pet crates 20. However, for some aspects of the present invention, the pet crate 20 may be devoid of fasteners for interconnecting multiple pet crates 20 to one another.

The illustrated sections 30,32 preferably provide top and bottom walls of the pet crate 20. However, for some aspects of the present invention, the sections 30,32 could be arranged to provide opposite sidewalls of the pet crate 20, e.g., so that the sections 30,32 serve to interconnect multiple pet crates 20 alongside one another in a lateral stacking configuration.

Turning to FIGS. 1-4, a pair of sidewalls 34 preferably serve to interconnect the top and bottom sections 30,32. The sidewalls 34 include upper and lower wall areas 64a,b separated by a line 66. The wall areas 64 are preferably substantially identical and each include an outer portion 68 and an inner portion 70, with the inner portion 70 being bounded on three sides by the outer portion 68. The portions 68,70 are interconnected along a shoulder 72. The inner portion 70 preferably presents laterally spaced vent holes 74 that serve to vent the pet crate 20.

The upper and lower wall areas 64 cooperatively present an exterior wall surface 76 of the sidewall 34. The wall surface 76 along each outer portion 68 of upper and lower wall areas 64 defines a first taper having a taper angle $\theta 1$ relative to a plane P (see FIG. 4). Plane P is generally perpendicular to the planes in which outer portions 40 lie. Preferably, the wall surface 76 along each inner portion 70 of wall areas 64 defines a second taper having a taper angle $\theta 2$ relative to plane P such that taper angle $\theta 1$ is greater than taper angle $\theta 2$. However, for some aspects of the present invention, the taper angle $\theta 1$ could be less than or substantially the same as taper angle $\theta 2$. The illustrated taper of wall areas 64 provides several advantages (for example, the wall taper permits the pet crate 20 to be molded by conventional molding techniques).

As discussed, the wall areas 64 are separated along line 66. Preferably, the line 66 extends laterally so that the wall areas 64 extend substantially the same distance from the line 66 to corresponding sections 30,32, with the wall areas 64 having substantially the same size and shape. However, the upper and lower wall areas 64 could be differently sized and shaped when compared to one another. For some aspects of the present invention, the sidewall 34 could have a single wall area so that the entire sidewall 34 tapers continuously in either an up or down direction from one of the sections 30,32 to the other section 30,32.

Figure 3:
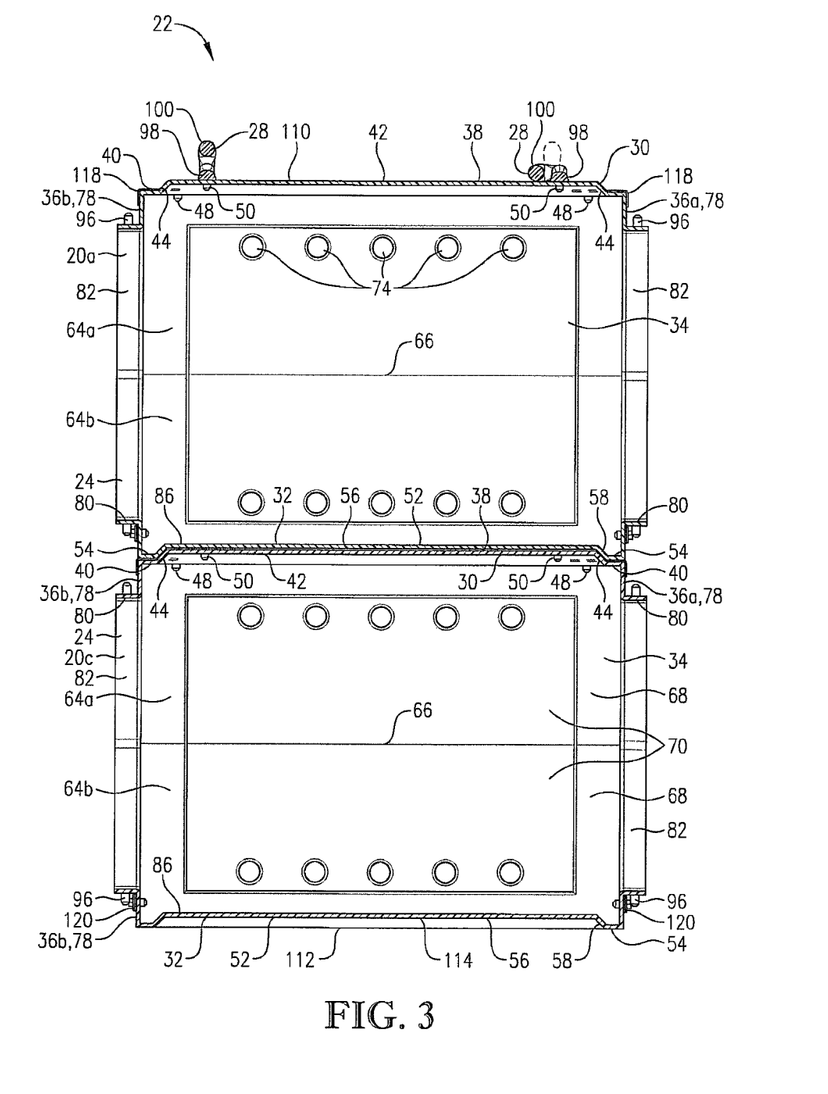
FIG. 3 is a fragmentary cross section of the bank of pet crates shown in FIGS. 1 and 2, showing upper and lower pet crates in the vertical configuration, with corresponding top and bottom sections of the upper and lower pet crates being nestably engaged and interconnected with one another.
Figure 4:
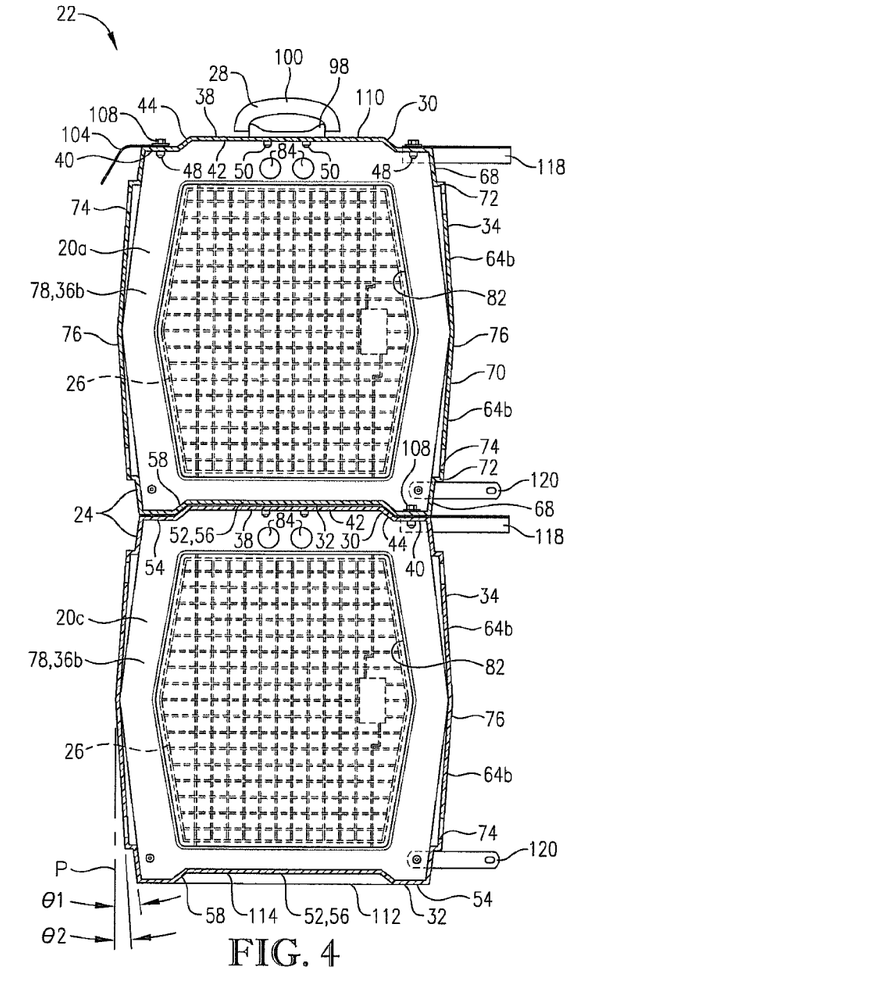
FIG. 4 is a fragmentary cross section of the bank of pet crates shown in FIGS. 1-3, showing the upper and lower pet crates in the vertical configuration, with the corresponding top and bottom sections nestably engaged and interconnected with one another.

Turning to FIGS. 3 and 4, fore and aft end walls 36a,b preferably include a flat wall portion 78 and an endless rim 80 attached to the flat wall portion 78. The rim 80 preferably defines an access opening 82 of the end wall 36, with the access opening 82 being positioned at a respective end of the housing 24 and sized to permit pet ingress and egress relative to an enclosed pet space, as will be discussed. For some aspects of the present invention, one of the end walls 36 could be constructed without an access opening 82. Furthermore, another portion of the housing 24 could present an access opening 82. Each of the end walls 36 preferably include a pair of nuts 46 positioned at locations 83 adjacent a lower end of the end wall 36 (see FIGS. 1 and 2). As with the top section 30, the nuts 46 of the end walls 36 are preferably integrally molded in place within the flat wall portion 78. Aft end wall 36b also presents holes 84 adjacent an upper end of the end wall 36b (see FIG. 4).

The sections 30,32 and sidewalls 34 preferably extend longitudinally between opposite housing ends located at end walls 36. Furthermore, the sections 30,32, sidewalls 34, and endwalls 36 present an enclosed pet space 86, with both access openings 82 permitting pet ingress and egress relative to the pet space 86 (see FIG. 3). However, for some aspects of the present invention, the pet crate 20 could have a single access opening 82 so that crate ingress and egress is only permitted through the single access opening 82. It has been found that the illustrated arrangement of openings 82 provides convenient access to the pet space 86 from locations fore and aft of the pet crate 20, particularly when the pet crate 20 is positioned in a vehicle (not shown). Thus, a front one of the openings 82 provides access to the pet space 86 from a location in front of the pet crate 20, and a rear one of the openings 82 provides access to the pet space 86 from a location behind the pet crate 20.

The illustrated pet space 86 is preferably uninterrupted between the ends of the pet crate 20. However, the principles of the present invention are applicable where the pet crate 20 includes a divider for installation within the pet space 86 to provide multiple compartments therein. For example, the pet space 86 could include a single divider mounted between the housing ends to define two compartments, with each compartment being accessible through a corresponding access opening 82.

Preferably, the sections 30,32, sidewalls 34, and end walls 36 are formed as a unitary molded construction. More preferably, this molded construction is formed by a rotational molding process. In addition, sections 30,32, sidewalls 34, and end walls 36 are preferably molded from a synthetic resin material and, more preferably, the synthetic resin material includes polyethylene naphthalate (PEN). However, the pet crate 20 could include other suitable materials to provide desired crate performance.

Turning to FIGS. 1 and 2, the doors 26 are pivotally mounted at opposite ends of the housing 24 and, in the usual manner, serve to permit selective crate ingress and egress. The illustrated door 26 preferably includes a mesh body 88 with male hinge elements 90 and a latch assembly 92 with retractable pins 94. The pins 94 are biased by a mechanism (not shown) into an extended position. The door 26 is pivotally mounted within a corresponding opening 82 by inserting hinge elements 90 into corresponding mounts 96 attached to the rim 80.

The door 26 is secured in a closed position by locating ends of the pins 94 in respective mounts 96. In the closed position, the door 26 substantially spans the corresponding opening 82 and restricts pet ingress and egress through the opening 82. The door 26 is shiftable out of the closed position by retracting the pins 94 from the extended position so that the pin ends become disengaged from respective mounts 96. The door 26 is then pivoted outwardly so that the latch assembly 92 is shifted away from the housing 24. Similarly, the door 26 is shiftable into the closed position by retracting the pins 94 and inwardly pivoting the door 26 into the closed position. The latch assembly 92 can then be released to permit the pins 94 to engage the respective mounts 96.

Turning to FIGS. 1 and 4, the handles 28 provide locations to grip and carry the pet crate 20. The handles 28 are conventional and include a base 98 and a curved grip 100 pivotally mounted to the base 98. The handle 28 is secured to the top section 30 of housing 24 by inserting screws 102 into holes presented by the base 98 and threading the screws 102 into corresponding nuts 46.

The handles 28 are preferably removable from the housing 24 so that multiple pet crates 20 can be stacked on top of one another. However, it is also within the ambit of the present invention where the handles 28 are fixed to the housing 24. In the illustrated embodiment, pet crates 20a,b have handles 28 attached thereto, and pet crates 20c,d have handles 28 removed so that the pet crates 20 can be vertically stacked. However, the top section 30 could present a recess that receives the handles 28 and permits the handles 28 to be retained in a folded position below the central portion 42. With such a construction, the top section 30 could be nested with a bottom section 32 while the handles 28 are secured to the top section 30 and folded into the recess.

The pet crate 20 further includes multiple tie-down brackets 104 that each comprise a unitary metal strap with holes 106 at opposite ends of the strap and a bend located between the holes 106 (see FIG. 1). The tie-down brackets 104 are operable to be attached at one end to locations 48 with screw assemblies 108 that preferably include a screw and a flat washer. The screw assemblies 108 preferably include a threaded screw and a flat washer. The illustrated pet crates 20a,b each have two of the brackets 104 attached to the top section 30 so that the bank 22 can be secured in an area, such as an automobile, by attaching the brackets 104 to another structure (not shown). However, the principles of the present invention are applicable where are alternative arrangement of brackets 104 is used to secure one or more pet crates 20. For instance, a single pet crate 20 could have up to four of the brackets 104 attached to corresponding locations 48.

Turning to FIGS. 1-4, one vertically arranged pair of pet crates 20a,c and another vertically arranged pair of pet crates 20b,d are stacked and secured to one another in an vertical stacking configuration. Corresponding sections 30,32 of each pair of pet crates 20 are preferably secured to one another with multiple screw assemblies 108 that engage corresponding nuts 46. In particular, screw assemblies 108 are inserted through corresponding holes 60 and threaded into corresponding nuts 46 (see FIG. 5). However, the principles of the present invention are applicable where alternative fastener assemblies are used with nuts 46 to secure vertically stacked pet crates 20 to one another. Furthermore, fasteners assemblies different from both screw assemblies 108 and nuts 46 could be employed to provide securement of stacked pet crates 20.

Preferably, the pet crates 20 are stacked so that the fore end walls 36a are located along a front wall of the bank 22 and the aft end walls 36b are located along a back wall of the bank 22. In this configuration, the ends of housings 24 are spaced from one another so that the access openings 82 are exposed to permit pet ingress and egress.

In the vertical configuration, the vertically stacked sets of crates 20a,c and 20b,d are nested with each other by arranging corresponding sections 30,32 of stacked crates 20 into nested engagement with one another. However, the nesting arrangement of the illustrated crates does not result in an entire one of the crates 20 being nested within another of the crates 20.

The illustrated shape of top and bottom sections 30,32 permits selective nesting interengagement of the sections 30,32. The central and transition portions 42,44 of the top section 30 cooperatively form a projection 110 that extends generally upwardly from the corresponding outer portion 40. The central and transition portions 56,58 of the bottom section 32 cooperatively define an opening 112 and a pocket 114 that extends inwardly from the opening 112 (see FIGS. 3 and 4). The central portion 42 presents a projection length dimension and a projection width dimension, and the opening 112 presents opening length and width dimensions. Preferably, the projection length and width dimensions are less than the length and width dimensions of the opening 112 to permit nesting of sections 30,32.

In one of the illustrated vertical nesting arrangements, the bottom section 32 of crate 20a is positioned so that the top section 30 of crate 20c is nested therewith. Specifically, the projection 110 of top section 30 extends through the opening 112 and into the pocket 114 when the sections 30,32 are nested with one another. Furthermore, the outer portions 40,54 are preferably positioned adjacent each other when the sections 30,32 are nested.

The top and bottom sections 30,32 are also preferably shaped to provide self-alignment as the sections 30,32 are positioned into nesting engagement. In particular, the transition portions 44,58 preferably extend at an acute angle relative to corresponding central and outer portions. As a result, the transition portions 44,58 generally guide the top and bottom walls 38,52 into substantial registry with one another when the engaged sections 30,32 are brought together in slight misalignment (i.e., where the top and bottom walls are out of registry with one another). While the top and bottom sections 30,32 are preferably configured so that adjacent sections 30,32 of vertically stacked pet crates can nest with one another, for some aspects of the present invention, pet crates 20 could be arranged and secured in the vertical stacking configuration without nesting of adjacent sections 30,32.

Turning to FIGS. 1, 2, 4, and 5, an upper pair of pet crates 20a,b and a lower pair of pet crates 20c,d each have pet crates secured alongside one another in a lateral stacking configuration. Preferably, the pet crate 20 includes a lateral coupler assembly 116 that is operable to interconnect a pair of pet crates 20 in the lateral configuration. The coupler assembly 116 preferably includes upper and lower couplers 118,120 and screw assemblies 108. The upper and lower couplers 118,120 preferably comprise unitary brackets formed from metal plate material.

In the lateral configuration, the upper and lower pairs of pet crates 20 are each preferably interconnected by securing a pair of upper couplers 118 to locations 48 of corresponding top sections 30. The upper and lower pairs of pet crates 20 are also each preferably interconnected by securing a pair of lower couplers 120 to locations 83 of corresponding end walls 36. However, the principles of the present invention are applicable where the couplers 118,120 are alternatively positioned or configured to interconnect the laterally stacked pet crates 20. For example, in the illustrated embodiment, the upper pair of pet crates 20a,b could be devoid of lower couplers 120 (e.g., where the coupler arrangement of the lower pair of pet crates 20c,d is determined to provide adequate interconnection of pet crates 20a,b).

In the lateral stacking configuration, adjacent sidewalls 34 of the interconnected pet crates 20 are spaced from one another. However, the principles of the present invention are applicable where the pet crates 20 are constructed so that adjacent sidewalls 34 of interconnected pet crates 20 engage one another. For instance, the sidewalls 34 could include features that permit such adjacent sidewalls 34 to nest with one another.

Turning to FIGS. 1, 2, and 5, the illustrated sections 30,32 and coupler assembly 116 preferably provide simultaneous interconnection of pet crates 20 in both the vertical and lateral stacking configurations. As discussed above, the upper and lower pairs of pet crates 20 are interconnected in the lateral configuration by coupler assemblies 116. Additionally, the pair of pet crates 20a,c and the pair of pet crates 20b,d are vertically arranged and secured to one another by extending the screw assembly 108 through the bottom section 32 and upper coupler 118 and into the corresponding nut 46 (see FIG. 5). Thus, the installed upper coupler 118 also preferably permits vertical stacking of pet crates 20.

The illustrated modular pet crate system allows the bank 20 to be variously configured by arranging pet crates 20 in various stacked configurations. The illustrated pet crates 20 of bank 22 are preferably substantially identical to one another. However, it is also within the ambit of the present invention where pet crates of different sizes are utilized and are operable to be interconnected in various arrangements to provide a bank of crates.

In operation, the illustrated bank 22 of pet crates 20 is operable to be moved and installed in various locations. The pet crates 20 are attached to one another by screw assemblies 108 and by coupler assemblies 116. Laterally stacked pet crates 20 are secured to each other by attaching upper and lower couplers 118,120 to top sections 30 and end walls 36 of the adjacent pet crates 20 with screws. Vertically stacked pet crates 20 are secured to each other by extending screws through holes in the bottom section 32 of the upper one of the pet crates 20 and the upper couplers 118, with the screws being threaded into corresponding nuts in the top section 30 of the lower one of the pet crates 20. Similarly, the pet crates 20 can be detached from one another by removing corresponding coupler assemblies 116 and screws.

When stored in a fixed location or in a moving vehicle, the pet crates 20 can be secured in place using conventional tie-down straps (not shown). In particular, straps can be secured to brackets 104 so that the bank 22 is securely held to a floor or other structure.

Figure 6:
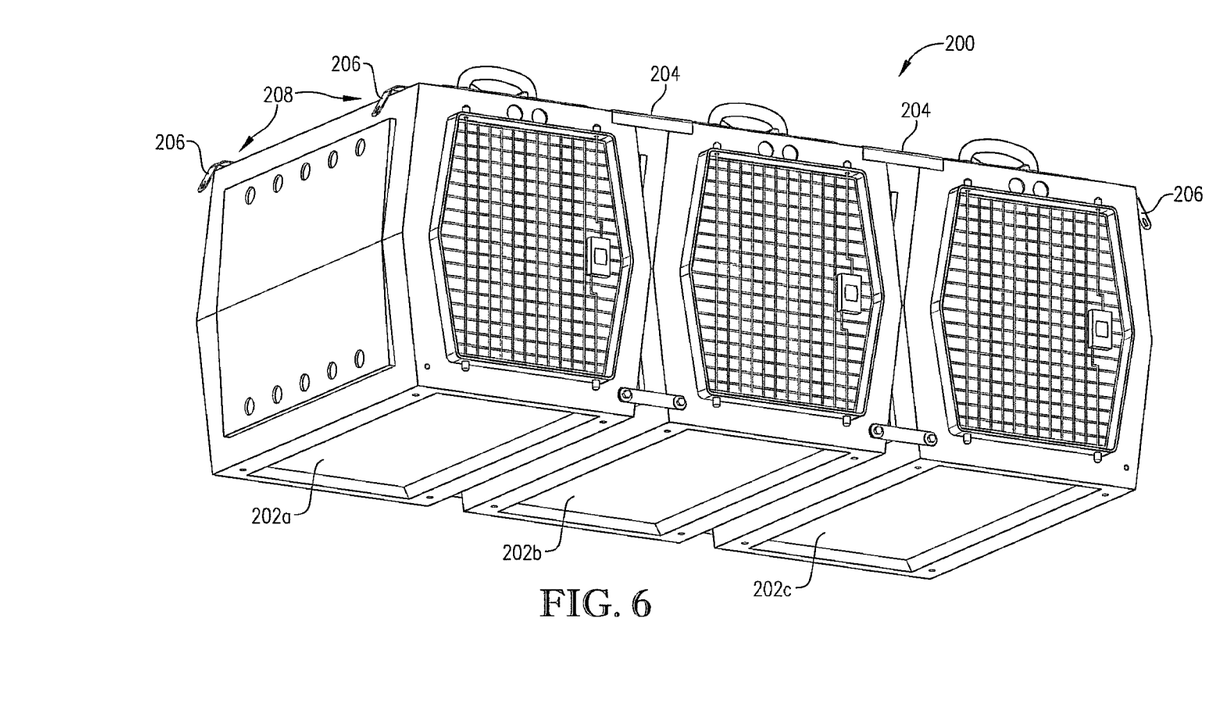
FIG. 6 is a rear perspective of an alternative bank of pet crates constructed in accordance with a second embodiment of the present invention, with the bank including three pet crates positioned alongside one another and interconnected with coupler assemblies.
Figure 7:
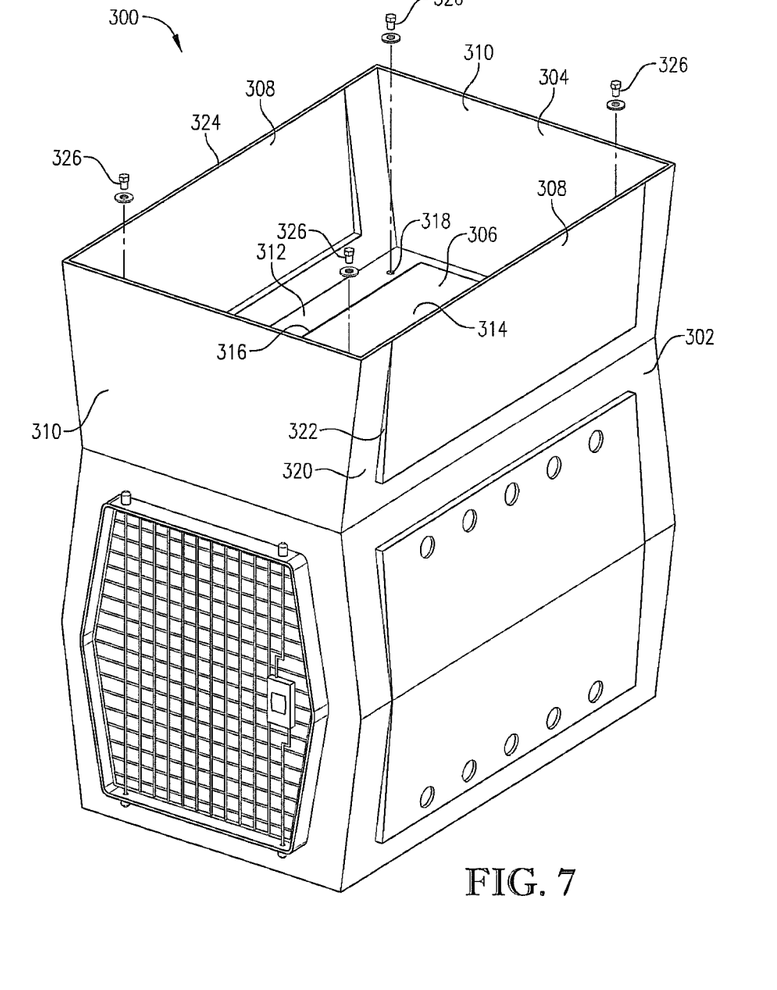
FIG. 7 is a front perspective of an alternative pet crate assembly including a pet crate and a stackable tray stacked on top of the pet crate and in nestable engagement with a top section of the pet crate.

Turning to FIGS. 6 and 7, alternative preferred embodiments of the present invention are depicted. For the sake of brevity, the remaining description will focus primarily on the differences of these alternative embodiments from the preferred embodiment described above.

Initially turning to FIG. 6, an alternative bank 200 of pet crates 202 is constructed in accordance with a second embodiment of the present invention. The illustrated bank 200 includes three pet crates 202a,b,c positioned alongside one another in the lateral configuration. Pet crates 202a,b,c are substantially identical to pet crates 20.

The pet crates 202 include lateral coupler assemblies 204, with a pair of assemblies 204 interconnecting pet crates 202a,b and another pair of assemblies 204 interconnecting pet crates 202b,c. Additionally, the pet crates 202a,c include tie-down brackets 206 attached to locations 208 along the top sections of pet crates 202a,c that are laterally outermost relative to the bank 200. However, the brackets 206 could be attached to other locations along the top sections of pet crates 202a,b,c.

Turning to FIG. 7, an alternative pet crate assembly 300 includes a pet crate 302 and a tray 304 in a nestably stacked arrangement with one another. Pet crate 302 is substantially identical to pet crate 20. The tray 304 is preferably unitary and includes a bottom section 306, sidewalls 308, and end walls 310 that are intergrally formed with one another. Preferably, the tray 304 is formed as a unitary molded construction. More preferably, this molded construction is formed by a rotational molding process. Also, the tray 304 is preferably molded from a synthetic resin material and, more preferably, the synthetic resin material includes polyethylene naphthalate (PEN).

The bottom section 306 is substantially the same as bottom section 32 of pet crate 20 and includes outer, central, and transition portions 312,314,316, with the outer portion 312 presenting holes 318. The sidewall 308 includes outer and inner portions 320,322 that taper similar to portions 68,70 of lower wall area 64. The end walls 310 each preferably comprise a unitary and continuous wall, with the sidewalls 308 and end walls 310 cooperatively forming a continuous upper edge 324 of the tray 304.

The tray 304 is configured to be stacked on top of pet crate 302. Specifically, the bottom section 306 is shaped to be in nested engagement with the top section (not shown) of pet crate 302, similar to the nesting engagement between adjacent sections 30,32 of vertically stacked pet crates 20. Furthermore, the tray 304 is removably secured to pet crate 302 by screw assemblies 326 extending through corresponding holes 318 and into nuts (not shown) secured in the top section of pet crate 302.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. Stackable pet crates operable to be interconnected with each other to form a bank of crates arrayed in a lateral and/or vertical configuration, each of said stackable pet crates comprising:
    a unitary molded crate housing including vertically arranged top and bottom wall sections, opposite side walls, and opposite end walls that are unitarily molded together and cooperatively present an enclosed pet space,
    said crate housing presenting a crate opening defined by one of the end walls,
    said crate opening permitting pet ingress and egress relative to the enclosed pet space,
    said one of the end walls being spaced from other of the interconnected crates when the pet crates are interconnected so that the crate opening is exposed to permit pet ingress and egress,
    at least one of said top and bottom wall sections including a wall and a threaded fastener insert integrally molded in place within the wall, with the threaded fastener insert of a first one of the pet crates being removably attached relative to a second one of the pet crates when the first and second pet crates are interconnected in the lateral or vertical configuration, such that the threaded fastener insert serves to connect the first and second crates in each of the lateral and vertical configurations,
    a coupler interconnecting the first and second pet crates when in the lateral configuration; and a plurality of threaded fastener elements, each corresponding to one of the threaded fastener inserts and being in threaded engagement therewith to cooperatively secure the coupler to the respective one of the first and second pet crates when the first and second pet crates are in the lateral configuration,
    at least one of said top and bottom wall sections defining an opening and a pocket extending inwardly from the opening, with the other of the wall sections presenting a projection,
    said opening presenting an opening dimension and said projection presenting a projection dimension smaller than the opening dimension so that the projection of each pet crate is operable to be nestably received by the pocket of one of the other pet crates when the pet crates are interconnected in the vertical configuration.

2. The stackable pet crates as claimed in claim 1,
    said at least one of the wall sections including a plurality of fastener inserts fixed to the connector wall;
    a coupler interconnecting a first one of the pet crates and a second one of the pet crates located alongside the first pet crate; and
    a plurality of fastener elements operable to engage corresponding fastener inserts,
    said coupler being secured to the first and second crates by corresponding fastener elements and fastener inserts.

3. The stackable pet crates as claimed in claim 1,
one of said wall sections including a plurality of fastener inserts fixed to the respective wall; and
a plurality of fastener elements received by the other of the wall sections, with the fastener elements operable to engage corresponding fastener inserts to secure the interconnected first and second crates to one another.

4. The stackable pet crates as claimed in claim 3,
said one of the wall sections presenting an outer margin, with the plurality of fastener inserts being spaced along the outer margin.

5. The stackable pet crates as claimed in claim 4, said other of the wall sections presenting a second outer margin, with the plurality of fastener elements being spaced along the second outer margin.

6. The stackable pet crates as claimed in claim 1,
said bottom wall section defining the opening and pocket and said top wall section presenting the projection.

7. The stackable pet crates as claimed in claim 1,
said at least one of the wall sections comprising the top wall section,
said top wall section including a plurality of fastener inserts integrally molded in place within the respective wall; and
a plurality of fastener elements received by the bottom wall section, with the fastener elements operable to engage corresponding fastener inserts, with the fastener elements operable to engage corresponding fastener inserts to secure the interconnected first and second crates to one another in the vertical configuration.

8. The stackable pet crates as claimed in claim 7,
said top wall section presenting an outer margin, with the plurality of fastener inserts being spaced along the outer margin.

9. The stackable pet crates as claimed in claim 8,
said bottom wall section presenting a second outer margin, with the plurality of fastener elements being spaced along the second outer margin.

10. The stackable pet crates as claimed in claim 1; and
a door swingably mounted relative to the one end wall and operable to swing into and out of a closed position in which the door substantially spans the crate opening to restrict pet ingress and egress through the crate opening.

11. The stackable pet crates as claimed in claim 10,
said crate housing presenting a second crate opening that permits pet ingress and egress through the second crate opening, with the second crate opening being spaced from the first-mentioned crate opening.

* * * * *